(12) United States Patent
Kim

(10) Patent No.: US 7,604,022 B2
(45) Date of Patent: Oct. 20, 2009

(54) MANUAL VALVE OF HYDRAULIC CONTROL SYSTEM FOR CONTINUOUSLY VARIABLE TRANSMISSION

(75) Inventor: Hyunsuk Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 518 days.

(21) Appl. No.: 11/512,657

(22) Filed: Aug. 30, 2006

(65) Prior Publication Data

US 2007/0131290 A1 Jun. 14, 2007

(30) Foreign Application Priority Data

Dec. 14, 2005 (KR) .................. 10-2005-0123199

(51) Int. Cl.
  *F16K 11/07* (2006.01)
(52) U.S. Cl. ................. 137/625.69; 137/625.68; 137/106
(58) Field of Classification Search ............... 137/102, 137/106, 484.2, 625.35, 625.65, 625.68, 137/625.69

See application file for complete search history.

(56) References Cited

U.S. PATENT DOCUMENTS

| | | | | | |
|---|---|---|---|---|---|
| 2,952,275 | A | * | 9/1960 | Mock | 137/625.42 |
| 5,085,102 | A | * | 2/1992 | Iwase et al. | 477/137 |
| 5,921,887 | A | * | 7/1999 | Zhang | 477/127 |
| 6,478,050 | B2 | * | 11/2002 | Park et al. | 137/625.69 |

FOREIGN PATENT DOCUMENTS

| | | |
|---|---|---|
| JP | 05-059060 | 8/1993 |
| KR | 10-20020006754 A | 1/2002 |

* cited by examiner

*Primary Examiner*—Robin O Evans
*Assistant Examiner*—Craig M Schneider
(74) *Attorney, Agent, or Firm*—Morgan, Lewis & Bockius LLP

(57) ABSTRACT

In order to minimize shift shocks during R→N and D→N manual shifts, in a manual valve of a hydraulic control system of a continuously variable transmission including a valve body having one input port and two output ports and a valve spool having a first land and a second land connecting the input port with one of the two output ports or completely blocking the input port from the two output ports, each land includes slots configured such that inner ends of the slots can be connected to the output ports in a neutral state.

10 Claims, 4 Drawing Sheets

MANUAL VALVE OF HYDRAULIC CONTROL SYSTEM FOR CONTINUOUSLY VARIABLE TRANSMISSION

CROSS-REFERENCE TO RELATED APPLICATION

This application claims priority to and the benefit of Korean Patent Application No. 10-2005-0123199 filed in the Korean Intellectual Property Office on Dec. 14, 2005, the entire contents of which are incorporated herein by reference.

BACKGROUND OF THE INVENTION (a) Field of the Invention

The present invention relates to a manual valve of a hydraulic control system of a continuously variable transmission for vehicles. More particularly, the present invention relates to a manual valve of a hydraulic control system of a continuously variable transmission that minimizes shift shock by controlling release pressure in D→N and R→N shifts.

(b) Description of the Related Art

A continuously variable transmission includes a fixed pulley and a moving pulley. The moving pulley provides thrust force on a side surface of a metal belt to a degree suitable for driving torque by hydraulic pressure in a hydraulic pressure chamber at a rear portion of the moving pulley. Continuous shifting occurs as a result of changes in diameter of the pulleys.

A continuously variable transmission also includes a planetary gear set with three operational elements connected by a forward clutch and a reverse clutch such that two of the three operational elements always operate as an input and an output element, and the third selectively acts as an input element or a fixed element.

Since the operating pressure supplied to the forward clutch and the reverse brake is exhausted only through an exhaust port formed in a manual valve, active control of exhaust hydraulic pressure is impossible.

However, viscosity of transmission fluid changes depending on temperature. Exhaust time is thus shorter at room temperature, and longer at lower temperatures because of an increase of viscosity of the transmission fluid. Exhaust time is traditionally not controlled in response to temperature, so shift shock occurs in D→N and R→N shifts.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a manual valve of a hydraulic control system of a continuously variable transmission including a valve body having one input port and two output ports, and a valve spool, having a first land and a second land, that connects the input port with one of the two output ports or completely blocks the input port from the two output ports. Each land has slots on its outer surfaces at each end, and inner ends of the slots connect to the output ports in a neutral state.

The slots may be tapered such that the outer end of each slot is deeper than the inner end.

Each land may have three slots: one at each end on the side opposite the input port, and one at the outer end on the side adjacent the input port.

The valve spool may further have a third land at one end, and an exhaust hydraulic line formed by an exhaust hole and an exhaust indentation therein may be formed in the third land such that exhaust pressure can be exhausted through an output port controlled by the second land.

The third land may open and close a bypass port communicating with the output port controlled by the first land in a parking P range.

In another embodiment of the present invention, a manual valve of a hydraulic control system of a continuously variable transmission includes a valve body including an input port through which hydraulic pressure is supplied from a pressure control valve; a reverse range port and a forward range port selectively supplying the hydraulic pressure supplied through the input port to a reverse brake and a forward clutch; and a valve spool including a first land and a second land disposed apart from each other at one side of a connecting member connected to a selector lever so as to selectively connect the input port to the reverse range port and the forward range port; and a third land having an exhaust hydraulic line therein so as to exhaust transmission fluid through the forward range port together with the second land. Lengths of the first and second lands may be longer than widths of respective circumferential grooves that form each output port. Slots may be formed on both ends of the first land and the second land such that inner ends of the slots can be connected to the output ports in a neutral state.

The slots may be tapered such that their outer ends are deeper than their inner ends.

Each land may have three slots: one at each end on the side opposite the input port, and one at the outer end on the side adjacent the input port.

The third land may be configured to open and close a bypass port communicating with the output port controlled by the first land in a parking P range.

DETAILED DESCRIPTION OF THE PREFERRED EMBODIMENTS

An exemplary embodiment of the present invention will hereinafter be described in detail with reference to the accompanying drawings.

Figure 1:
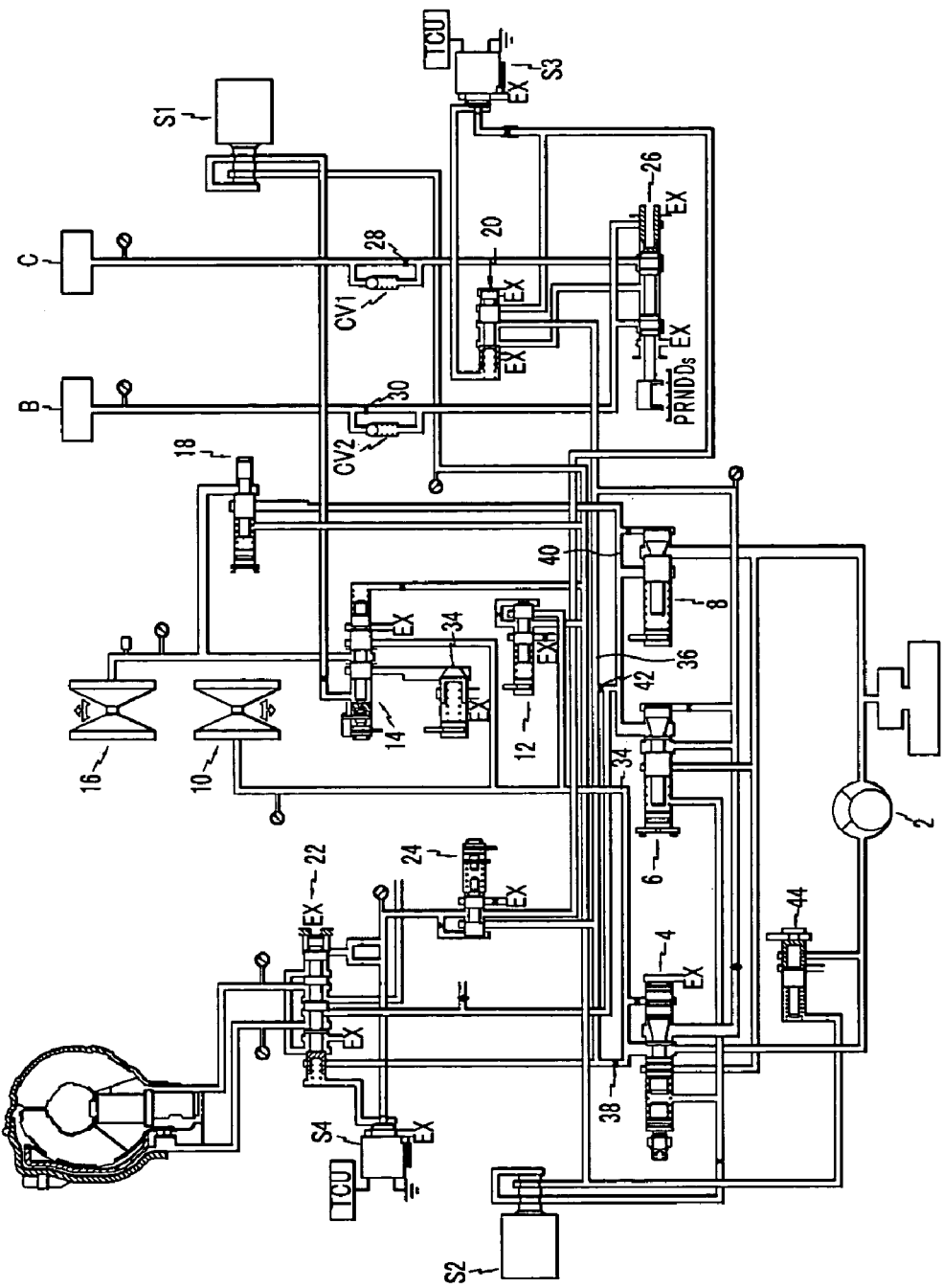
FIG. 1 is a hydraulic circuit diagram of a hydraulic control system to which a manual valve according to an exemplary embodiment of the present invention is applied.

Referring to FIG. 1, a hydraulic control system for operating a belt-type continuously variable transmission is configured such that three-stage relief of hydraulic pressure generated by a hydraulic pump 2 is performed by a line regulator valve 4, a second regulator valve 6, and a torque converter feed valve 8.

The hydraulic pressure regulated by the line regulator valve 4 is simultaneously supplied directly to a secondary pulley 10; to a first solenoid valve S1 and a second solenoid valve S2 via a solenoid control valve 12; and to a primary pulley 16, as an operating pressure thereof, and a fail-safe valve 18, as a control pressure thereof, via a speed ratio control valve 14.

In addition, a control pressure of the first solenoid valve S1 is supplied to the speed ratio control valve 14 as a control pressure thereof, and a control pressure of the second solenoid valve S2 is supplied to the line regulator valve 4 and the second regulator valve 6 as control pressures thereof.

In addition, a portion of the hydraulic pressure of the line regulator valve 4 is supplied to the second regulator valve 6 and is then secondly regulated. The regulated hydraulic pressure is supplied to a pressure control valve 20, a damper clutch control valve 22 as a torque converter supply pressure, and a reducing valve 24.

The hydraulic pressure supplied to the reducing valve 24 is reduced and is then supplied to the third solenoid valve S3 and the fourth solenoid valve S4 as control pressures thereof. The hydraulic pressure supplied to the pressure control valve 20 is controlled by the third solenoid valve S3 and is then supplied to the manual valve 26, then selectively supplied to the forward clutch C or the reverse brake B depending on range conversion of the manual valve 26. The hydraulic pressure supplied to the damper clutch control valve 22 acts as a torque converter supply pressure according to a control of the fourth solenoid valve S4.

In addition, a torque converter feed valve 8 communicates with a fail-safe valve 18 and a release line of the damper clutch control valve 22, and controls torque converter release pressure.

The first solenoid valve S1, the second solenoid valve S2, the third solenoid valve S3, and the fourth solenoid valve S4 may be a 3-way valve. An orifice 28 and a check valve CV1 are disposed in parallel in a line connecting the manual valve 26 and the forward clutch C, and an orifice 30 and a check valve CV2 are disposed in parallel in a line connecting the manual valve 26 and the reverse brake B. Accordingly, engaging pressure supplied to the forward clutch C and the reverse clutch B is controlled by the orifices 28 and 30, and during disengagement, hydraulic pressure is rapidly exhausted by the check valves CV1 and CV2.

In addition, an exhaust valve 34 is connected to the fail-safe valve 18 such that release pressure of the primary pulley 16 can be controlled, a line downstream of the line regulator valve 4 is connected to a torque converter supply pressure line 36 of the second regulator valve 6 by an orifice 38 disposed therebetween, and the torque converter supply pressure line 36 is connected to a torque converter release pressure line 40 by an orifice 42 disposed therebetween. These are configured so as to stably control pressure released from a high hydraulic pressure.

In addition, a line relief valve 44, which is supplied with reduced pressure of the reducing valve 12 as a control pressure thereof, is disposed between the hydraulic pump 2 and the line regulator valve 4 to relieve excessive line pressure.

Figure 2:
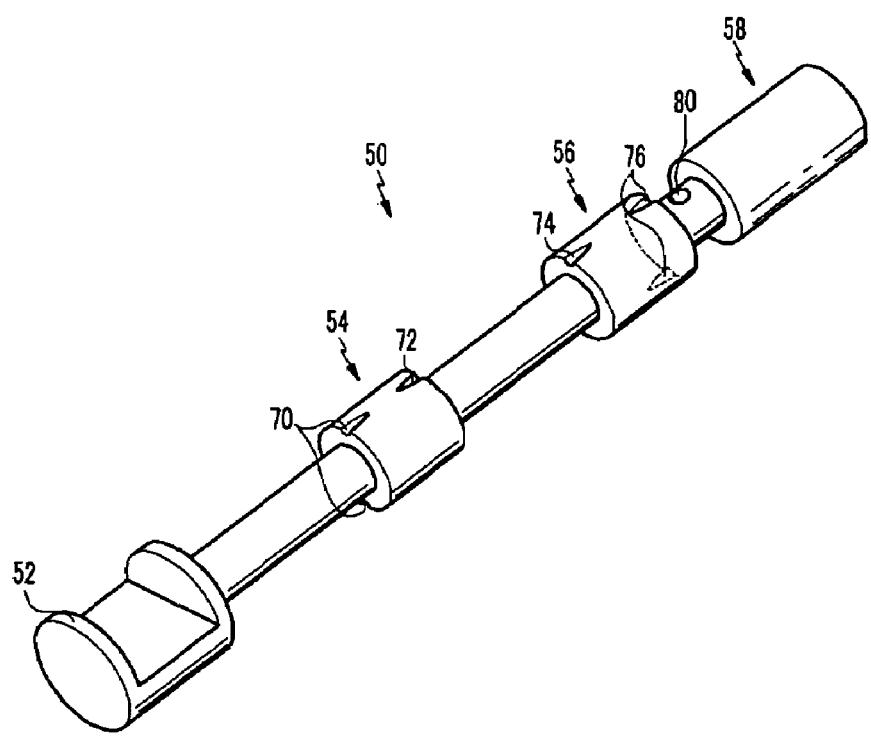
FIG. 2 is a perspective view of a valve spool of a manual valve according to an exemplary embodiment of the present invention.
Figure 3:
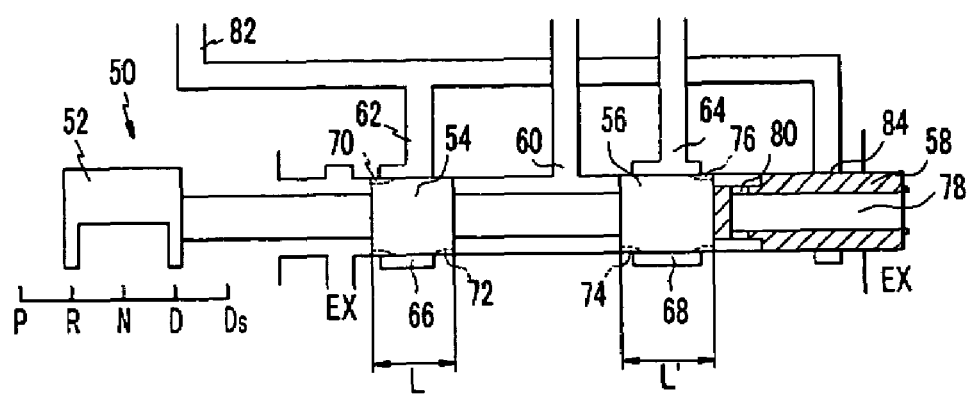
FIG. 3 is a schematic diagram of a manual valve according to an exemplary embodiment of the present invention.

In a hydraulic control system of a continuously variable transmission according to an embodiment of the present invention, as shown in FIG. 2 and FIG. 3, a valve spool 50 of the manual valve 26 has a connecting member 52 at one end, and a first land 54, a second land 56, and a third land 58. The first and second lands 54 and 56 are disposed at positions such that the input port 60 can selectively communicate with the reverse range port 62 and the forward range port 64.

Lengths L and L' of the first and second lands 54 and 56 are longer than widths of circumferential grooves 66 and 68, respectively, which form the reverse range and forward range ports 62 and 64. Slots 70, 72, 74, and 76 are formed on each end of the first and second lands 54 and 56. The slots 70, 72, 74, and 76 are configured such that inner ends thereof can be connected to the reverse range and forward range ports 62 and 64 in a neutral state.

Referring to FIG. 3, the slots 70, 72, 74, and 76 are deeper at their outer ends, and the depths decrease toward their inner ends.

Each land may have three slots: two at their outer ends 70, 76, but only one 72, 74, at their inner ends. Slots 72 and 74 are disposed at the side of the land 54, 56 that faces towards input port 60.

These are formed such that hydraulic pressure of the input port 60 can be connected to the reverse range and forward range ports 62 and 64 in a neutral N range.

In addition, an exhaust indentation 78, one side of which is open along an axial direction, is formed within the third land 58, and an exhaust hole 80 connected to the exhaust indentation 78 is disposed between the second land 56 and the third land 58 in a direction perpendicular to the exhaust indentation 78.

Further, the third land 58 is configured to open and close a bypass port 84 communicating with the reverse range pressure line 82 in a parking P range.

In a manual valve 26 according to an embodiment of the present invention, the reverse range port 62 and the forward range port 64 are connected to the exhaust port EX through slots 70 and 76 in a neutral position, so that the hydraulic pressure that has been supplied to the reverse brake B and the forward clutch C is exhausted.

In such an exhaust state, if the temperature of the transmission fluid is high, the viscosity of the transmission fluid is low and exhaust time is short, and if the temperature of the transmission fluid is low, the viscosity of transmission fluid is high and exhaust time is long. The exhaust time is controlled by controlling the third solenoid valve S3.

That is, when the transmission fluid is hot, the third solenoid valve S3 controls the pressure control valve 20 such that high control pressure is supplied to the manual valve 26.

Then, during R→N shift, the control pressure joins the reverse range exhaust pressure through slots 70 and 72, and during D>N shift, the control pressure joins the forward range exhaust pressure through slots 74 and 76. Accordingly, exhaust of the reverse range exhaust pressure or the forward range exhaust pressure is hindered by an increase of amount of hydraulic fluid, so exhaust pressure is controlled.

On the other hand, when the transmission fluid is cold, the control pressure of the pressure control valve 20 is lowered so that the reverse range exhaust pressure and the forward range exhaust pressure are exhausted through the exhaust port EX of the pressure control valve 20 as well as through the exhaust port EX. Therefore, exhaust time is shortened.

Figure 4:
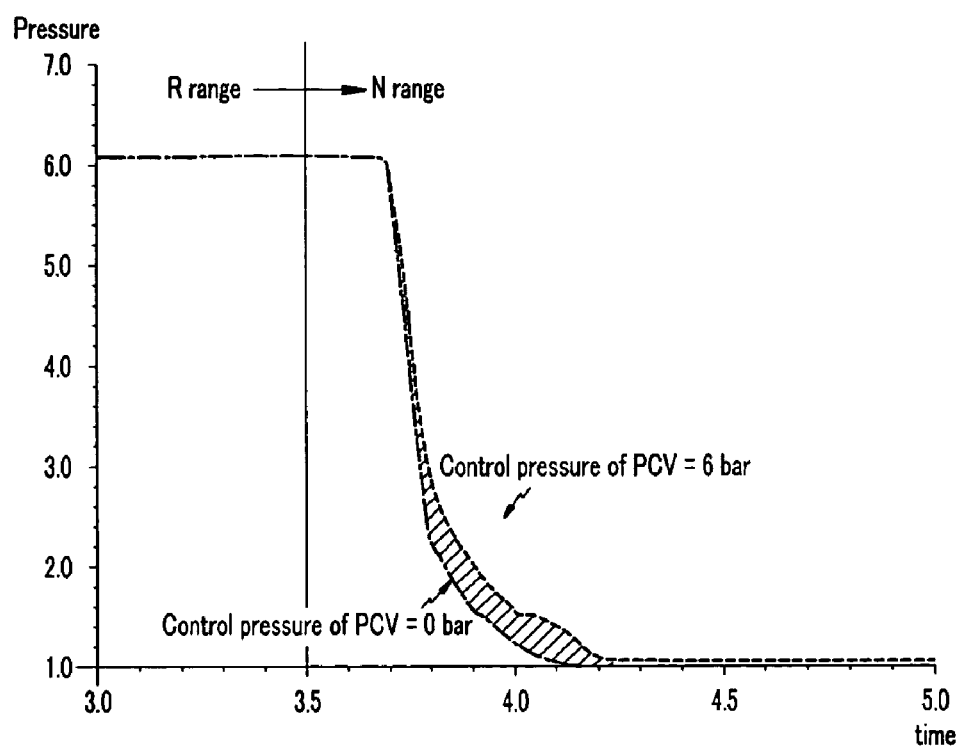
FIG. 4 is a drawing showing effects of the present invention.

As shown in FIG. 4, from the result of simulations for R→N shift, the exhaust time is higher when the control pressure of the pressure control valve 20 is 6 bar than when the control pressure of the pressure control valve 20 is 0 bar.

In a manual valve according to the present invention, the control pressure of the pressure control valve is lowered when the viscosity of transmission fluid is high because of a low temperature of transmission fluid, thereby shortening exhaust time, and on the other hand, the control pressure is increased when the viscosity of transmission fluid is low because of a high temperature of transmission fluid, thereby increasing exhaust time. Accordingly, shift shocks can be minimized during R→N and D→N manual shifts.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manual valve of a hydraulic control system of a continuously variable transmission, comprising:
   a valve body comprising an input port and first and second output ports;
   a valve spool comprising a first land and a second land, each configured to connect the input port to a respective one of the output ports or to at least substantially block the input port from the output port, each land comprising at least one slot configured such that an inner end of the slot can be connected to the output port in a neutral state; and
   a third land, said third land comprising an exhaust hydraulic line comprising an exhaust hole and an exhaust indentation such that exhaust pressure can be exhausted through the second output port.

2. The manual valve of claim 1, wherein an outer end of the slot is deeper than an inner end.

3. The manual valve of claim 1, wherein the first and second lands each comprise an inner and an outer end, a first side adjacent the input port, and a second side opposite the input port, wherein the at least one slot of each land comprises:
   a first slot at an intersection of the outer end and the first side;
   a second slot at an intersection of the outer end and the second side; and
   a third slot an intersection of the inner end and the second side.

4. The manual valve of claim 3, wherein exactly three slots are disposed on each of the first and second lands.

5. The manual valve of claim 1, wherein the third land is configured to open and close a bypass port communicating with the first output port in a parking P range.

6. A manual valve of a hydraulic control system of a continuously variable transmission, comprising:
   a valve body comprising an input port through which hydraulic pressure is supplied from a pressure control valve and a reverse range port and a forward range port selectively supplying said input port hydraulic pressure to a reverse brake and a forward clutch; and
   a valve spool, comprising a first land and a second land disposed apart from each other at one side of a connecting member connected to a selector lever so as to selectively connect the input port to the reverse range port and the forward range port; and a third land having an exhaust hydraulic line therein so as to exhaust transmission fluid through the forward range port together with the second land;
   wherein lengths of the first land and the second land are longer than widths of circumferential grooves forming respective output ports; and wherein
   each of the first and second lands comprises at least one slot configured such that an inner end of the slot can be connected to the respective output port in a neutral state.

7. The manual valve of claim 6, wherein an outer end of the slot is deeper than an inner end.

8. The manual valve of claim 6, wherein the first and second lands each comprise an inner and an outer end, a first side adjacent the input port, and a second side opposite the input port, wherein the at least one slot of each land comprises:
   a first slot at an intersection of the outer end and the first side;
   a second slot at an intersection of the outer end and the second side; and
   a third slot an intersection of the inner end and the second side.

9. The manual valve of claim 8, wherein exactly three slots are disposed on each of the first and second lands.

10. The manual valve of claim 6, wherein the third land is configured to open and close a bypass port communicating with the reverse range pressure line in a parking P range.

* * * * *